United States Patent [19]

Miyagawa et al.

[11] 4,016,306

[45] Apr. 5, 1977

[54] PROCESS FOR FORMING A COATED FILM IN WATER

[75] Inventors: Norio Miyagawa; Mitsuo Sato; Juichi Kobayashi; Takashi Kobayashi, all of Nagoya, Japan

[73] Assignee: Mitsubishi Rayon Co., Ltd., Tokyo, Japan

[22] Filed: July 3, 1975

[21] Appl. No.: 592,893

[30] Foreign Application Priority Data

July 15, 1974 Japan .............................. 48-81529
July 15, 1974 Japan .............................. 48-81530

[52] U.S. Cl. .................................... 427/54; 427/44
[51] Int. Cl.$^2$ ......................................... B05D 3/06
[58] Field of Search ............................... 427/44, 54

[56] References Cited

UNITED STATES PATENTS

| 3,645,984 | 2/1972 | Dowbenko et al. | 427/54 |
| 3,679,731 | 7/1972 | Parker et al. | 427/54 |
| 3,714,007 | 1/1973 | Borrel et al. | 427/54 |

Primary Examiner—John H. Newsome
Attorney, Agent, or Firm—Oblon, Fisher, Spivak, McClelland & Maier

[57] ABSTRACT

An acrylic resin composition containing a thermoplastic acrylic polymer in combination with a specific ethylenically unsaturated diacrylate such as diacrylate of hydroxypivalyl hydroxypivalate is found to be cured by irradiation of active rays in an aqueous medium in the presence of a photo-sensitizer to form a cured film with excellent properties. This composition is especially suitable for coating a plastic tile.

5 Claims, No Drawings

PROCESS FOR FORMING A COATED FILM IN WATER

This invention relates to a process for forming a coated film, which comprises coating an acrylic resin composition which is curable by irradiation of active rays on a substrate, then providing an aqueous layer on the coated composition and irradiating active rays over said aqueous layer to form a cured coated film on said substrate.

Generally speaking, when a coated film comprising a composition of a radical polymerizable compound and a suitable sensitizer is cured by crosslinking by irradiation of active rays in the air, oxygen in the air acts as radical scavenger of said radical polymerizable compound. Therefore, crosslinking of the coated film is inhibited and it is very difficult to form a sufficiently cured coated film. In order to remove such inconvenience, it has been proposed to effect irradiation of active rays under an atmosphere of inert gases such as nitrogen, carbon dioxide, etc. Such an inert gas is required to be highly pure with an oxygen content of not more than 0.1%. If an inert gas with an oxygen content of more than 0.1% is used for formation of coated film according to the above process, the crosslinking density is lowered in the coated film obtained and hence it is very difficult to produce a coated film with excellent properties. On the other hand, when an inert gas with high purity is used, coating cost is increased on account of expensive price of such a gas to increase the cost of the product itself to industrial disadvantage, although coated products with excellent properties can be obtained. It has also been proposed to use a liquid in place of an inert gas in a process as described above, as disclosed by U.S. Pat. No. 3,714,007. While this process improves crosslinking density of the coated film obtained, it involves various drawbacks such that uncured coating material is dissolved or diffused in the liquid layer provided on the uncured coated film; thus no product with excellent appearance as well as various film properties can be obtained.

It has now been found that the process, wherein an aqueous layer is provided on an uncured coated surface and irradiation of active rays is effected thereover to cure the coated film, can be improved by using a mixture of a specific acryloylated unsaturated compound and an unsaturated acrylic resin incorporated as paint binder in the coating composition.

The present invention provides a process for forming a coated film which is cured by crosslinking, which comprises coating on a substrate to be coated an acrylic resin composition which is curable by irradiation of active rays comprising:

A. an acrylic polymer obtained by polymerization of an acrylic monomer of the general formula (I):

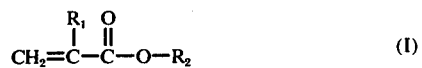

wherein $R_1$ represents hydrogen atom or methyl group, $R_2$ represents hydrogen atom, an unsubstituted or substituted alkyl group, an unsubstituted or substituted cycloalkyl group having 1 to 8 carbon atoms, or an aryl group;

B. an ethylenically unsaturated diacrylate of the general formula (II) or (III):

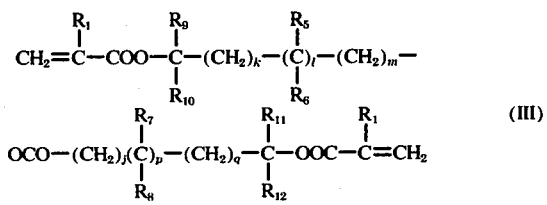

wherein $R_1$ is as defined above; $R_3$ represents a divalent aliphatic or cycloaliphatic hydrocarbon residue having 2 to 10 carbon atoms or a polyalkylene glycol residue having 1 to 10 ether bonds in the molecule; $R_4$ represents a carboxyl eliminated divalent fatty acid residue having 1 to 20 carbon atoms or an aromatic or an aliphatic hydrocarbon residue; each of $R_5$, $R_6$, $R_7$ and $R_8$ represents hydrogen atom, a substituted alkyl group having 1 to 8 carbon atoms, a cycloalkyl group or an aryl group; each of $R_9$, $R_{10}$, $R_{11}$ and $R_{12}$ represents hydrogen atom, an alkyl group having 1 to 8 carbon atoms, a cycloalkyl group or an aryl group; $n$ represents an integer of 1 to 10; and each of $k$, $l$, $m$, $j$, $p$ and $q$ represents an integer of 0 to 5, and (C) a photopolymerization initiator, followed by provision of an aqueous layer on the coated layer, and then irradiating active rays over said aqueous layer.

The acrylic polymer (A) which constitutes the acrylic resin composition to be used in the present invention can be produced from at least one monomers represented by the aforesaid formula by way of solution polymerization, bulk polymerization, emulsion polymerization, etc. Typical examples of the acrylic monomers represented by the general formula (I) are methyl (meth)acrylate, ethyl (meth)acrylate, n-butyl (meth)acrylate, iso-butyl (meth)acrylate, 2-ethylhexyl (meth)acrylate, stearyl (meth)acrylate, isopropyl (meth)acrylate, cyclopentyl (meth)acrylate, dodecyl (meth)acrylate, hydroxyethyl (meth)acrylate, etc. The molecular weight of the acrylic polymer (A) which is determined by calculation of intrinsic viscosity is suitably within the range from 10,000 to 300,000. If the molecular weight exceeds 300,000, compatibility of the polymer (A) with the ethylenically unsaturated diacrylate (B) is deteriorated, whereby no coated film with excellent characteristics can be obtained. On the contrary, if the molecular weight is less than 10,000, the cured coated film produced from the coating material containing the acrylic polymer (A) is inferior in adhesiveness with a substrate.

The acrylic polymer (A) is contained in the coating material in an amount of 1 to 50 wt. %, preferably 5 to 20 wt. % based on the total composition. If it is contained in an amount less than 1 wt. % in the acrylic resin composition, the uncured coated film produced therefrom is highly soluble in the aqueous layer provided thereon and therefore the cured coated film obtained is not sufficiently smooth on its surface; no coated product excellent in appearance can be obtained. On the other hand, if the acrylic polymer (A) is used in an amount more than 50 wt. %, the cured coated film obtained according to the above procedure is inferior in film properties such as resistance to chemicals, contamination or weathering, etc.

The ethylenically unsaturated diacrylate (B) represented by the general formula (II) which is another constituent of the acrylic composition of the present invention can be obtained by reacting a hydroxyl containing polyester resin with hydroxyl value of 100 to 600 with at least one of (meth)acrylic acid and (meth)acrylic acid anhydride by dehydrating condensation in the presence of an acid catalyst such as sulfuric acid, p-toluene sulfonic acid, phosphoric acid, etc. or by reacting said hydroxyl containing polyester resin with halogenated product of (meth)acrylic acid in the presence of a dehalogenating catalyst such as pyridine.

Typical examples of the ethylenically unsaturated diacrylate (B) are as follows:

1. A condensate of a polyester resin prepared from phthalic acid anydride and ethylene glycol with acrylic acid:

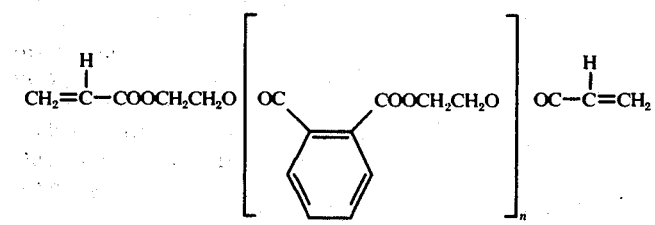

2. A condensate of a polyester resin prepared from phthalic acid anhydride and neopentyl glycol with methacrylic acid:

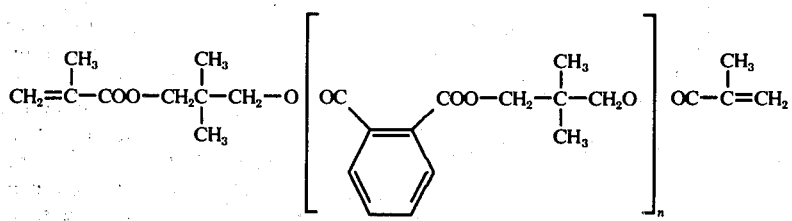

3. A condensate of a polyester resin prepared from adipic acid and neopentyl glycol with acrylic acid:

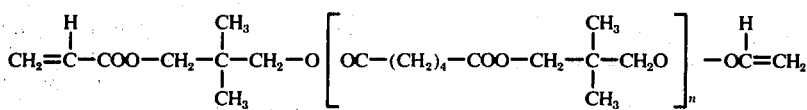

The ethylenically unsaturated diacrylate (B) represented by the general formula (III) can be prepared by condensing a mono-ester diol with (meth)acrylic acid or (meth)acrylic acid anhydride in the presence of an acid catalyst such as sulfuric acid, p-toluene sulfonic acid, phosphoric acid, etc. or by subjecting said mono-ester diol to dehalogenation reaction with a halogenated product of (meth)acrylic acid in the presence of a dehalogenating catalyst such as pyridine. The mono-ester diol to be used in producing the ethylenically unsaturated diacrylate (B) represented by the general formula (III) has preferably a neopentyl type structure, namely, the compound wherein $R_5$, $R_6$, $R_7$ and $R_8$ are methyl, ethyl or propyl group, $R_9$, $R_{10}$, $R_{11}$ and $R_{12}$ are hydrogen atoms, $q$ and $k$ are zero, $l$ and $q$ are 1, and $m$ and $j$ are 1 or 2. For example, the compound, wherein $R_5$ and $R_6$ are methyl groups, $R_7$ to $R_{12}$ are hydrogen atoms, $k$ and $q$ are zero, $l$, $m$ and $p$ are 1, and $j$ is 2, is hydroxylpivalyl hydroxybutyrate; the compound, wherein $R_7$ and $R_8$ are methyl groups, $R_9$ to $R_{12}$ are hydrogen atoms, $k$ and $p$ are 1, and $l$, $m$, $j$ and $q$ are zero, is hydroxyethyl hydroxypivalate; and the compound, wherein $R_5$ to $R_8$ are methyl groups, $R_9$ to $R_{11}$ are hydrogen atoms, $m$, $l$, and $p$ are 1, and $k$, $j$ and $q$ are zero, is hydroxypivalyl hydroxypivalate. These monoesters diols can be used either alone or in mixtures.

The ethylenically unsaturated diacrylate (III) prepared by these methods are exemplified by acryloxypivalyl acryloxypivalate of the formula:

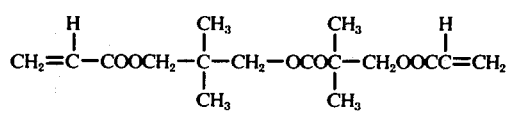

which is obtained by condensing hydroxypivalyl hy-

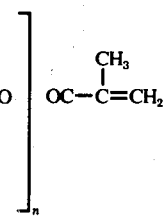

droxypivalate of the formula:

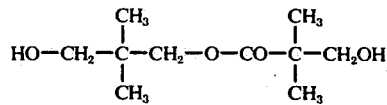

with acrylic acid.

The photopolymerization initiator or photosensitizer to be used in practicing the process of the present invention is a compound which can initiate photopolymerization by irradiation of light with wavelengths of 2000 to 8000 A, and examples thereof are benzoin, benzoin methyl ether, benzoin isopropyl ether, benzyl, benzophenone, anthraquinone, 2,2-diethoxy anthracene, 2-ethyl anthraquinone, diphenyl sulfide, dibenzyl, disulfide, mercaptan, Methylene Grey, benzoyl peroxide, azobisisobutyronitrile, etc. They may be used alone or in mixtures. If desired, they may be used in combination with co-photo-sensitizers such as teramethyldiamino benzophenone, triethanol amine, etc.

The amount of the photo-sensitizer to be incorporated in the acrylic resin composition is desirably within the range from 0.01 to 10 wt. % based on the composition. It is not preferred to use excessive amount of photo-sensitizer, since it may cause deterioration in weather resistance such as yellow decoloration of the coated film obtained.

As the light sources for emission of active rays to be used in the present invention, there may be employed high pressure mercury lamp, ultra-high pressure mercury lamp, carbon arc lamp, UV-fluorescent lamp, xenon lamp, and the like.

The acrylic resin composition to be used in the present invention is good in affinity with an aqueous medium, but low in solubility in water. Accordingly, when this acrylic resin composition is coated on a substrate and then an aqueous medium layer is provided on the coated film, oxygen present on the coated surface can completely be removed without causing damage of the flat coated surface. Therefore, when active rays are irradiated over the water surface, crosslinking curability is very high and the cured coated film is excellent in flatness of the surface. In addition, by the effect of the aqueous medium layer provided on the coated film in accordance with the present process, elevation of the temperature on the coated surface at the time of irradiation of active rays can almost completely be avoided. Hence, the coated product can be prevented from warp or shrinkage of the coated film at the time of curing; thus the coated film can be prevented from degradation in physical properties such as impact strength. Furthermore, in conventional process for coating a synthetic resin film or sheet wherein active rays are used as energy source for curing of coating film, said substrate film or sheet is liable to be shrinked or deformed by thermal shrinkage. Such as inconvenience can greatly be reduced by the process of the present invention. While the acrylic resin composition used in the present invention comprises 50 to 99 wt. % of a compound of the general formula (II) or (III) selected from among various crosslinking curable unsaturated compounds and 1 to 50 wt. % of a thermoplastic acrylic polymer which is rarely used as the constituent for coating composition, said acrylic resin composition is deteriorated little in crosslinking curability at the time of irradiation of active rays.

The substrates which can be used in the present invention include metal plates, metal films, plastic molded products, plastic sheets, plastic films, inorganic plates, glass materials, wooden materials, woven cloths, knitted cloths, unwoven cloths, etc. They are not specifically limited, so far as they are not impaired by immersion in water for several seconds. However, the particular feature of the process of the present invention can most fully be exhibited when it is applied for coating of plastic tiles. Conventionally, plastic tiles have been produced by mixing an organic synthetic resin such as polyvinyl chloride resin, polyurethane resin, polyester, resin, etc. with inorganic filler such as calcium carbonate, talc, asbestos, silica, stone powders, glass powders, metal powders, etc., and then shaping the mixture by compression molding or extrusion molding. The plastic tiles produced by these methods are poorly resistant to abrasion. To improve the abrasion resistance of plastic tiles, there have been employed a method for coating the surface thereof with a thermosetting resin or a method for coating the surface thereof with an unsaturated resin, followed by the irradiation by UV-rays or electron beams. However, these methods have the drawback in that the plastic tiles warp or become distorted. When the process of the present invention is applied for improvement of abrasion resistance of plastic tiles, no such inconvenience as mentioned above occurs and there can be produced plastic tiles excellent in surface flatness, appearance, surface hardness and contamination resistance. Furthermore, the process of the present invention uses no volatile substance during the procedure of coating which may cause air pollution. The present process is also free from the problem of water pollution, since the resin composition used in the present invention is very little in solubility in an aqueous medium. Thus, the present invention provides an extremely excellent process for formation of a coated film.

The present invention is explained in more detail with reference to the following preparative Examples and Examples, wherein "parts" signify "parts by weight."

PREPARATIVE EXAMPLE 1

Preparation of Acrylic Polymer (A)

Into a reactor equipped with a stirrer, a nitrogen injection pipe, a thermometer and a reflux condenser are charged 1500 parts of xylene, followed by heating at 130° C. Then a mixture of 1350 parts of methyl methacrylate, 1350 parts of ethyl acrylate, 300 parts of methacrylic acid, 60 parts of di-tert-butyl peroxide and 30 parts of tert-dodecyl mercaptan is added dropwise over 2 hours and the mixture is maintained at 140° C for an additional 5 hours. The resulting acrylic resin solution is supplied to a thin membrane evaporator to evaporate xylene, whereby an acrylic polymer (A) is obtained.

This acrylic polymer (A), when being dissolved in toluene with 40 % solid content, has the following resin solution properties:

Transparency: good, Gardner color number: 2, Gardner viscosity: T, Specific gravity: 0.950, Acid value: 2.8

PREPARATIVE EXAMPLE 2

Preparation of Acrylic Polymer (B)

Into the same reactor as used in preparative Example 1 are charged 2100 parts of water, 0.5 part of sodium polyacrylic acid, 3 parts of sodium primary phosphate and 11 parts of sodium secondary phosphate and the mixture is heated at 70° C. Then, a mixture of 310 parts of ethyl acrylate, 680 parts of methyl methacrylate, 14 parts of benzoyl peroxide and 11 parts of tert-dodecyl mercaptan is added dropwise to the reactor and the reaction mixture is thereafter heated to 80° C and maintained at said temperature for 4 hours. After evaporation of water, an acrylic polymer (B) is obtained.

This acrylic polymer (B) has the following properties (40 % toluene solution):

Transparency: good, Gardner color number: 2 or less, Gardner viscosity: W, Specific gravity: 0.970, Acid value: 1.1

PREPARATIVE EXAMPLE 3

Preparation of Ethylenically Unsaturated Diacrylate (C):

Into a reactor equipped with a stirrer, a nitrogen injection pipe, a thermometer and a reflux condenser are charged 2960 parts of phthalic acid anhydride and 730 parts of ethylene glycol and the reaction is performed at 210° C for 6 hours while removing condensed water to obtain hydroxylterminated polyester resin having hydroxyl value of 454. 2000 Parts of acrylic acid are added to 3170 parts of this polyester resin and the reaction is carried out at 95° C for 6 hours, followed by evaporation of toluene, to give a purified ethylenically unsaturated diacrylate (C) having the following resin properties:

Transparency: good, Gardner color number: 2, Gardner viscosity: V, Specific gravity: 1.28, Acid value: 3.2

PREPARATIVE EXAMPLE 4

Preparation of Ethylenically Unsaturated Diacrylate (D):

2960 Parts of phthalic acid anhydride and 4576 parts of neopentyl glycol are charged in the same reactor as in preparative Example 3 and the reaction is performed at 210° C for 6 hours while removing condensed water to obtain a hydroxylterminated polyester resin having a hydroxyl value of 360. To 3480 parts of this polyester resin are added 2300 parts of acrylic acid, 30 parts of hydroquinone, and 3800 parts of toluene. The reaction is performed at 95° C for 6 hours, followed by evaporation of toluene, to give a purified ethylenically unsaturated diacrylate (D) with the following resin properties:

Transparency: good, Gardner color number: 3, Gardner viscosity: T, Specific gravity: 1.12, Acid value: 2.6

PREPARATIVE EXAMPLE 5

Preparation Of Ethylenically Unsaturated Diacrylate (E):

Into the same reactor is preparative Example 3 are charged 3265 parts of hydroxypivalyl hydroxypivalate, 2420 parts of acrylic acid, 55 parts of hydroquinone and 4410 parts of cyclohexane. The reaction is carried out at 95° C for 5 hours, followed by evaporation of toluene, to give purified ethylenically unsaturated diacrylate (E) with the following resin properties:

Transparency: good, Gardner color number: 1, Gardner viscosity: A, Specific gravity: 1.05, Acid value: 0.8

EXAMPLE 1 – 4

The acrylic polymers (A) and (B) obtained in preparative Examples 1 and 2 were compounded with the ethylenically unsaturated diacrylates (C), (D) and (E) obtained in preparative Examples 3 to 5 according to the combinations set forth in Table 1, each mixture being admixed with 2.0 wt. % of benzoin methyl ether as photosensitizer to prepare acrylic resins F, G, H and I. These coating compositions were coated on the substrates as shown in Table 1 by means of the coaters as shown in Table 1. These coated products were dipped in water to the depth as shown in Table 1 and the coated films were cured by irradiation of active rays under the conditions as set forth in Table 1. The results of measurement of the properties of the cured coated films of the resulting products are also shown in Table 1.

Table 1

| Acrylic resin composition: | Example 1 | Example 2 | Example 3 | Example 4 |
| --- | --- | --- | --- | --- |
| Acrylic polymer (A) | 158 parts | 98 parts | | |
| Acrylic polymer (B) | | 118 parts | 118 parts | 98 parts |
| Ethylenically unsaturated diacrylate (C) | 822 parts | | | |
| Ethylenically unsaturated diacrylate (D) | | 764 parts | 30 parts | |
| Ethylenically unsaturated diacrylate (E) | | | 832 parts | 882 parts |
| Sensitizer (benzoin methyl ether | 20 parts | 20 parts | 20 parts | 20 parts |
| Conditions: | Example 1 | Example 2 | Example 3 | Example 4 |
| Substrate | Aluminum plate | Acrylonitrile-butadiene-styrene co-polymer sheet | Asbestos plate | Polyvinyl chloride tile |
| Coater | Knifcoater | Flow-coater | Sprayer | Roll-coater |
| Curing conditions by irradiation in water | — | Two high-pressure mercury lamps with output of 5 KW, 200W/inch, with travelling speed of 12 m/min. and water depth of 5 cm | | — |
| Amount of coating (g/ft²) | 1 | 3 | 5 | 2 |
| Results: | | | | |
| State of curing | Good | Good | Good | Good |
| Appearance (surface smoothness) | Good | Good | Good | Good |
| Adhesiveness (peel-off of cross-cuts with cellophane tape) | No peel-off | No peel-off | No peel-off | No peel-off |
| Pencil hardness | 2 H | H | 2 H | H |

Table 1-continued

| | | | | |
|---|---|---|---|---|
| Acid resistance (5% $H_2SO_4$, spot test, 24 hours) | no change (5*) | no change (5) | no change (5) | no change (5) |
| Alkali resistance (1% $Na_2CO_3$, spot test, 24 hours) | no change (5) | no change (5) | no change (5) | no change (5) |
| Gasoline resistance (Regular, spot test, 24 hours) | no change (5) | no change (5) | no change (5) | no change (5) |
| Abrasion resistance (Taber abrasion tester: 500 g loading, H-18, 5000 rotations) | — | — | — | 12 mg |

*) expressed by a 5-grade visual measurement (1 means the worst, 5 means the best)

COMPARATIVE EXAMPLE 1 – 3

A resinous composition is prepared by mixing 580 parts of the acrylic polymer (A) obtained in preparative Example 1 and 400 parts of the ethylenically unsaturated diacrylate (D) obtained in preparative Example 4 with 20 parts of benzoin methyl ether (Comparative example 1). Another resinous composition is prepared by mixing 980 parts of the ethylenicaly unsaturated diacrylate (E) obtained in preparative Example 5 with 20 parts of benzoin methyl ether (Comparative example 2). Still another resinous composition is prepared by mixing 980 parts of an unsaturated polyester resin composition (comprising 590 parts of a polycondensate prepared from 1 mole of phthalic anhydride, 1 mole of maleic anhydride and 2.2 mole of propylene glycol and 410 parts of styrene) with 20 parts of benzoin methyl ether (Comparative Example 3). These compositions are coated on polyvinyl chloride tiles by means of roll coater under the conditions as shown in Table 2. The coated tiles are irradiated in water under the same conditions as in Examples to obtain tiles having cured coatings. The results are shown in Table 2.

What we claim is:

1. A process for forming a coated film which comprises:
    coating a substrate with an acrylic resin composition, which is curable upon irradiation by active rays, comprising a photopolymerization initiator and a resin component consisting of a combination of
    A. an acrylic polymer obtained by polymerization of an acrylic monomer of formula I:

$$CH_2=\underset{R_1}{\overset{}{C}}-\overset{O}{\overset{\|}{C}}-O-R_2 \qquad (I)$$

wherein $R_1$ represents hydrogen atom or methyl group, $R_2$ represents hydrogen atom, an unsubstituted or substituted alkyl group, an unsubstituted or substituted cycloalkyl group having 1 to 8 carbon atoms, or an aryl group;

B. an ethylenically unsaturated diacrylate of formula (II) or (III):

$$CH_2=\underset{R_1}{\overset{}{C}}-COOR_3O[OCR_4COOR_3O]_nOC-\underset{R_1}{\overset{}{C}}=CH_2 \qquad (II)$$

Table 2

| Composition: | Comparative example 1 | Comparative example 2 | Comparative example 3 |
|---|---|---|---|
| Acrylic polymer (A) | 580 parts | | |
| Ethylenically unsaturated diacrylate (D) | 400 parts | | |
| Ethylenically unsaturated diacrylate (E) | | 980 parts | |
| Unsaturated polyester resin | | | 980 parts |
| Sensitizer (benzoin methyl ether) | 20 parts | 20 parts | 20 parts |
| Conditions: | | | |
| Substrate | PVC tile | PVC tile | PVC tile |
| Coater | Roll coater | Roll coater | Roll coater |
| Curing conditions in water | Same as in Examples | Same as in Examples | Same as in Examples |
| Amount of coating (gr/ft³) | 2 | 2 | 2 |
| Results: | | | |
| State of curing | Not good | Not good | Not good |
| Appearance (surface smoothness) | Not good | Not good | Not good |
| Adhesiveness (same as in Table 1) | peeled off | peeled off | peeled off |
| Pencil hardness | 5 B | H B | 5 B |
| Acid resistance (same as in Table 1) | Not good(1) | (3) | Not good(1) |
| Alkali resistance (same as in Table 1) | Not good(1) | (3) | Not good(1) |
| Gasoline resistance (same as in Table 1) | Not good(1) | (3) | Not good(1) |
| Abrasion resistance (same as in Table 1) | unmeasurable | 180 mg | unmeasurable |

-continued

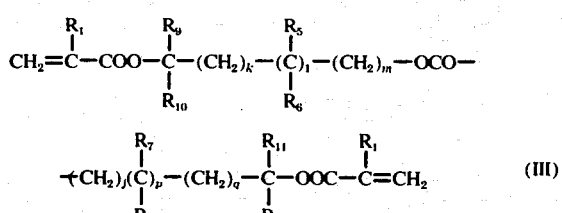

wherein $R_1$ is as defined above; $R_3$ represents a divalent aliphatic or cycloaliphatic hydrocarbon residue having 2 to 10 carbon atoms or a polyalkylene glycol residue having 1 to 10 ether bonds in the molecule; $R_4$ represents a carboxyl eliminated divalent fatty acid residue having 1 to 20 carbon atoms or an aromatic or an aliphatic hydrocarbon residue; each of $R_5$, $R_6$, $R_7$, and $R_8$ represents hydrogen atom, a substituted alkyl group having 1 to 8 carbon atoms, a cycloalkyl group or an aryl group; each of $R_9$, $R_{10}$, $R_{11}$ and $R_{12}$ represents hydrogen atom, an alkyl group having 1 to 8 carbon atoms, a cycloalkyl group or an aryl group; $n$ represents an integer of 1 to 10; and each of $k$, $l$, $m$, $j$, $p$ and $q$ represents an integer of 0 to 5; providing the coated layer with a water layer and
subjecting said combined layers to irradiation from a source of active rays to cure the coated film.

2. A process as claimed in claim 1, wherein the resin composition contains the acrylic polymer (A) in an amount ranging from 1 to 50 % by weight based on the composition.

3. A process as claimed in claim 1, wherein the acrylic polymer (A) has a molecular weight between 10,000 and 30,000.

4. A process as claimed in claim 1, wherein the ethylenically unsaturated diacrylate (B) is prepared from hydroxypivalyl hydroxypivalate.

5. A process as claimed in claim 1, wherein the substrate to be coated is a plastic tile.

* * * * *